United States Patent
Gassoway

(10) Patent No.: US 7,761,919 B2
(45) Date of Patent: Jul. 20, 2010

(54) INTRUSION DETECTION WITH AUTOMATIC SIGNATURE GENERATION

(75) Inventor: Paul Gassoway, Norwood, MA (US)

(73) Assignee: Computer Associates Think, Inc., Islandia, NY (US)

( * ) Notice: Subject to any disclaimer, the term of this patent is extended or adjusted under 35 U.S.C. 154(b) by 1300 days.

(21) Appl. No.: 11/132,611

(22) Filed: May 18, 2005

(65) Prior Publication Data

US 2005/0262560 A1 Nov. 24, 2005

Related U.S. Application Data

(60) Provisional application No. 60/572,684, filed on May 20, 2004.

(51) Int. Cl.
*H04L 9/32* (2006.01)
(52) U.S. Cl. .............................. 726/24; 726/25; 713/188
(58) Field of Classification Search ................... 726/13, 726/22–25; 713/188
See application file for complete search history.

(56) References Cited

U.S. PATENT DOCUMENTS 5,623,600 A 4/1997 Ji et al.
5,842,002 A 11/1998 Schnurer et al.

(Continued)

FOREIGN PATENT DOCUMENTS

GB 2 362 076 A 11/2001

(Continued)

OTHER PUBLICATIONS

Notification of Transmittal of International Search Report and Written Opinion, International application No. PCT/US2005/017443, 11 pages, Aug. 24, 2005.

(Continued)

*Primary Examiner*—Benjamin E Lanier
*Assistant Examiner*—Hadi Armouche
(74) *Attorney, Agent, or Firm*—Baker Botts L.L.P.

(57) ABSTRACT

A method for detecting malicious programs within a computer network includes monitoring at least one first packet of data communicated over the network, analyzing the at least one first packet of data to detect the presence of a malicious program, generating a signature of the at least one first packet of data when a malicious program is detected, monitoring at least one second packet of data communicated over the network and detecting evidence of the malicious program in the at least one second packet of data utilizing the generated signature.

42 Claims, 7 Drawing Sheets

U.S. PATENT DOCUMENTS

| | | |
|---|---|---|
| 5,948,104 A | 9/1999 | Gluck et al. |
| 6,301,668 B1 | 10/2001 | Gleichauf et al. |
| 6,557,920 B1 | 5/2003 | Hobson et al. |
| 7,017,186 B2 | 3/2006 | Day |
| 7,080,000 B1 | 7/2006 | Cambridge |
| 7,343,624 B1 | 3/2008 | Rihn et al. |
| 7,409,714 B2 | 8/2008 | Gupta et al. |
| 2002/0147780 A1 | 10/2002 | Liu et al. |
| 2002/0166063 A1* | 11/2002 | Lachman et al. ............ 713/200 |
| 2003/0110396 A1 | 6/2003 | Lewis et al. |
| 2003/0145225 A1 | 7/2003 | Bruton, III et al. .......... 713/201 |
| 2003/0159070 A1 | 8/2003 | Mayer et al. |
| 2003/0196095 A1 | 10/2003 | Jeffries et al. ............... 713/181 |
| 2004/0047356 A1 | 3/2004 | Bauer |
| 2004/0181664 A1 | 9/2004 | Hoefeimeyer et al. |
| 2005/0265331 A1 | 12/2005 | Stolfo |

FOREIGN PATENT DOCUMENTS

| | | |
|---|---|---|
| WO | WO 02/23805 A2 | 3/2002 |
| WO | WO 02/37755 A2 | 5/2002 |
| WO | WO 03/055148 A1 | 7/2003 |
| WO | WO 03/090426 A1 | 10/2003 |

OTHER PUBLICATIONS

Notification of Transmittal of International Search Report and Written Opinion; Application No. PCT/US2005/017601, 7 pages, Sep. 14, 2005.

Apap, et al., "Detecting Malicious Software by Monitoring Anomalous Windows Registry Accesses", Springer-Verlag Berlin, Heidelberg 2002; RAID 2002, LNCS 2516, pp. 36-53, 2002.

USPTO; Office Action for U.S. Appl. No. 10/849,633, (12 pagaes), Jul. 11, 2008.

USPTO; Office Action for U.S. Appl. No. 10/849,633, (15 pagaes), Nov. 16, 2007.

USPTO; Office Action for U.S. Appl. No. 10/849,633, (11 pages), Jun. 15, 2007.

USPTO; Office Action for U.S. Appl. No. 11/133,962, (14 pages), Oct. 16, 2008.

Notification of Transmittal of the International Search Report for application PCT/US2005/017446 (7 pages), Sep. 15, 2005.

Written Opinion of the International Searching Authority for application PCT/US2005/017446 (7 pages), Sep. 15, 2005.

USPTO Office Action U.S. Appl. No. 10/849,633, dated Feb. 23, 2009.

* cited by examiner

INTRUSION DETECTION WITH AUTOMATIC SIGNATURE GENERATION

REFERENCE TO RELATED APPLICATIONS

This application is based on and claims the benefit of Provisional Application Ser. No. 60/572,684 filed May 20, 2004, the entire contents of which are herein incorporated by reference.

BACKGROUND

1. Technical Field

The present disclosure relates to intrusion detection and, more specifically, to intrusion detection with automatic signature generation.

2. Description of the Related Art

In today's highly computer dependant environment, computer security is a major concern. The security of computer networks is routinely threatened by computer viruses, Trojan horses, worms and the like. Once computer networks are infected with these malicious programs, the malicious programs may have the ability to damage expensive computer hardware, destroy valuable data, tie up limited computing resources or compromise the security of sensitive information.

Worms can be particularly catastrophic forms of malicious programs. Worms can infect a computer network and quickly commandeer network resources to aid in the worm's further propagation. After a worm has infected computers and computer networks a destructive payload can then be delivered. Destructive payloads can have many harmful consequences, for example, valuable hardware and/or data can be destroyed, sensitive information can be compromised and network security measures can be circumvented.

As a result of quick propagation, new worms can travel fast and quickly become a threat to computers and computer networks around the world.

To guard against the risk of malicious programs such as worms, businesses may often employ antivirus programs, intrusion detection systems and intrusion protection systems. Antivirus programs are computer programs that can scan computer systems to detect malicious computer code embedded within infected computer files. Malicious code can then be removed from infected files, the infected files may be quarantined or the infected file may be deleted from the computer system. Intrusion detection systems and intrusion protection systems (IDSs) are systems that can be implemented on a computer network that monitor the computer network to detect anomalous traffic that can be indicative of a potential problem, for example a worm infection. IDSs may be either active or passive. Active IDSs may take affirmative measures to remedy a potential infection when found while passive IDSs may be used to alert a network administrator of the potential problem.

IDSs often attempt to identify the presence of network infection by analyzing packets of data that are communicated over the network. Packets are generally examined and compared with signatures of known malicious programs. When a signature matches a packet, the packet may be indicative of a malicious program infection.

IDSs that rely on signatures for the detection of malicious programs must regularly receive and install updated signatures corresponding newly discovered malicious programs. If no signature has been received and installed for a particular malicious program, the IDS might not be able to identify the malicious program.

Modern malicious programs such as worms are able to spread very quickly from computer network to computer network throughout the world. Unfortunately, they can spread so quickly that they can infect many networks before a signature for detecting the malicious program can be developed, distributed and installed.

An IDS is needed that can detect the presence of previously unknown malicious programs and automatically generate an effective signature that can be used by the IDS to protect the network against the malicious program.

SUMMARY

A method for detecting malicious programs within a computer network includes monitoring at least one first packet of data communicated over the network, analyzing the at least one first packet of data to detect the presence of a malicious program, generating a signature of the at least one first packet of data when a malicious program is detected, monitoring at least one second packet of data communicated over the network and detecting evidence of the malicious program in the at least one second packet of data utilizing the generated signature.

A system for detecting malicious programs within a computer network includes a first-packet-monitoring unit for monitoring at least one first packet of data communicated over the network, an analyzing unit for analyzing the at least one first packet of data to detect the presence of a malicious program, a generating unit for generating a signature of the at least one first packet of data when a malicious program is detected, a second-packet-monitoring unit for monitoring at least one second packet of data communicated over the network and a detecting unit for detecting evidence of the malicious program in the at least one second packet of data utilizing the generated signature.

A computer system includes a processor and a computer recording medium including computer executable code executable by the processor for detecting malicious programs within a computer network. The computer executable code includes code for monitoring at least one first packet of data communicated over the network, code for analyzing the at least one first packet of data to detect the presence of a malicious program, code for generating a signature of the at least one first packet of data when a malicious program is detected, code for monitoring at least one second packet of data communicated over the network and code for detecting evidence of the malicious program in the at least one second packet of data utilizing the generated signature.

A computer recording medium includes computer executable code executable by a processor for detecting malicious programs within a computer network. The computer executable code includes code for monitoring at least one first packet of data communicated over the network, code for analyzing the at least one first packet of data to detect the presence of a malicious program, code for generating a signature of the at least one first packet of data when a malicious program is detected, code for monitoring at least one second packet of data communicated over the network and code for detecting evidence of the malicious program in the at least one second packet of data utilizing the generated signature.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
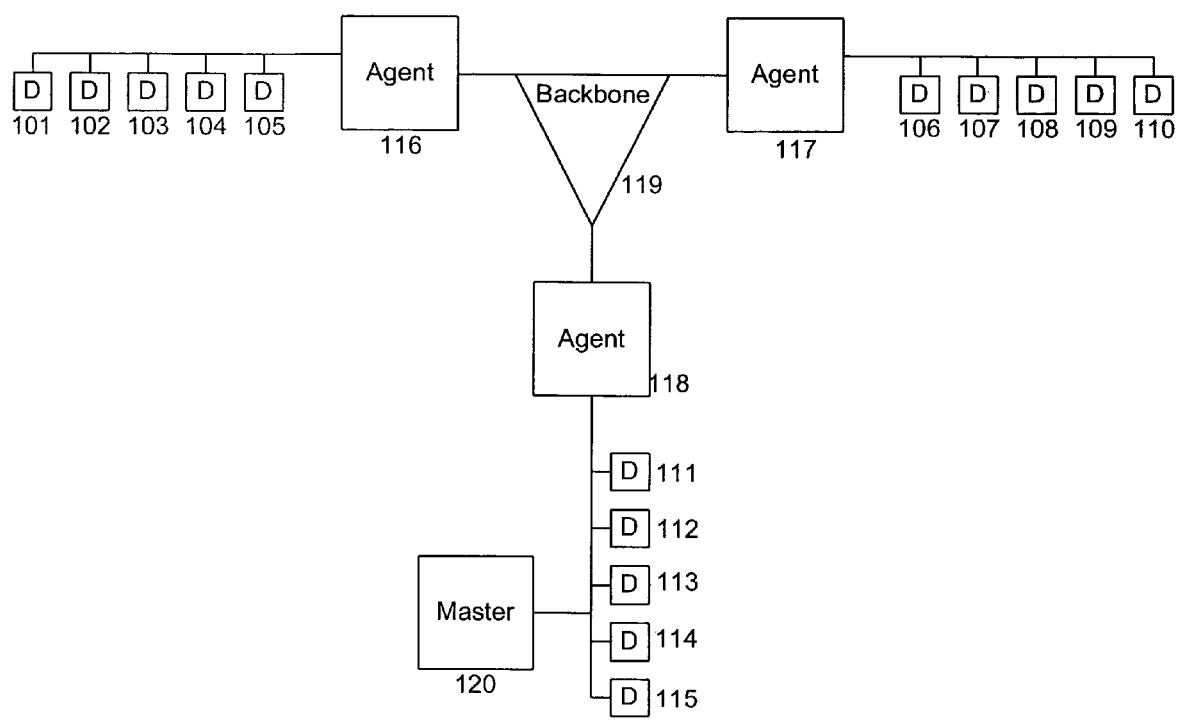
FIG. 1 illustrates an example of an active IDS according to an embodiment of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

The present disclosure enables an IDS to detect new and unknown malicious programs. According to embodiments of the present disclosure, the detection of new and unknown malicious programs can be facilitated by the automatic generation and implementation of new definitions.

IDSs according to embodiments of the present disclosure may be either passive or active. An active IDS according to an embodiment of the present disclosure is able to detect a new and unknown malicious program and prevent that malicious program from propagating from one subnet of the computer network to another subnet and/or prevent that malicious program from propagating beyond the computer network, for example, to another computer network.

Subnets are generally isolated segments of the computer network. Subnets are often connected to the backbone of the computer network through a network connecting device, for example a router, switch and/or hub.

A passive IDS according to an embodiment of the present disclosure is able to detect a new and unknown malicious program and allow network administrators to become aware of the malicious program. Because passive IDSs according to some embodiments of the present disclosure generally do not attempt to directly block the propagation of malicious programs, packets can remain free to travel between subnets without first having to pass through an IDS control device.

FIG. 1 illustrates an example of active IDSs according to an embodiment of the present disclosure. In this example, a plurality of network devices 101-105 form a first subnet. These network devices can be any devices that are connected to the network, for example, network devices can be computers connected to the network. A first Agent 116 connects the first subnet to the network backbone 119. According to an embodiment of the present disclosure, an Agent is a unit that monitors the exchange of packets between the subnet and the network and communicates with the Master 120. While there may be multiple Agents 116-118, a single Master 120 is all that is generally required. Agents 116-118 may be dedicated network devices and/or Agents 116-118 may be computer programs executed on a network device, for example a computer connected to the network. According to an embodiment of the present disclosure, Agents 116-118 are placed in such a way that communication between the subnets and the rest of the computer network are through the Agents 116-118.

According to an embodiment of the present disclosure, Agents 116-118 act as firewalls to prevent certain packets from being passed across the Agent and thereby prevent those packets from being delivered to the destination addresses of those packets A second Agent 117 connects a second subnet formed by a plurality of network devices 106-110 to the network backbone 119 and a third Agent 118 connects a third subnet formed by a plurality of network devices 111-115 to the network backbone 119.

Agents 116-118 monitor packets that are communicated across the respective subnets and report packet information to the Master 120. The Master 120 may be located anywhere within the computer network, for example, within one of the subnets, or may be located outside of the computer network, for example, on a remote server connected over the internet through a virtual private network (VPN).

According to some embodiments of the present disclosure, Agents 116-118 may send sample packets to the Master 120. Sample packets can be copies of packets that have traveled across the Agent 116-118, for example, from the corresponding subnet to the backbone 119. Sample packets may be selected at set intervals, for example, every $100^{th}$ packet may be sent or a packet can be sent every second. Sample packets may be sent at random, for example, every packet may be given a 1 in 100 chance of being sent as a sample packet.

The Master 120 analyzes the sample packets and may look for indications of a malicious program infection. For example, the Master 120 may analyze sample packets and watch for a proliferation of similar packets. Because malicious programs often generate many copies of themselves in an attempt to propagate, a large proliferation of similar packets may indicate the presence of a malicious program infection.

When proliferation of similar packets is detected by the Master 120, the Master 120 can generate a signature for the proliferating packets. A signature can represent certain characteristics by which a packet can be identified. For example, a signature may be a hash value of the packet. A hash value is generally a number that can be used to identify a packet. The hash value is generally determined by performing a mathematical algorithm on the data that makes up the packet in question. There are many algorithms for calculating a packet's hash value that are known in the art. Among these are the MD5 and SHA algorithms. While there are theoretically many different possible packets that can all produce the same hash value, the chances of two different files having the same hash value are infinitesimal.

The signature may then be sent to the Agents 116-118. According to some embodiments of the present disclosure, Agents 116-118 can then block the proliferation of packets matching the signature sent to it by the Master 120 by preventing those packets from being delivered to the destination addresses of those packets. This can be accomplished, for example, by the Agent 116-118 analyzing every packet that attempts to be communicated between the subnet and the rest of the network before the packet may proceed across the Agent 116-118 and calculating the hash values for those packets to see if the hash values matches a signature hash value that has been sent to the Agent 116-118 by the Master 120. Because calculating the hash value of every packet might be time consuming, Agents 116-118 need not calculate hash values of packets unless a signature has been sent to the Agent 116-118 from the Master 120. Packets that match the signature may then be prevented from being transmitted across the Agent 116-118. Agents 116-118 can also log the proliferation of packets matching the signature sent to it by the Master 120.

By logging the proliferation of packets corresponding to malicious programs, network administrators can be made aware of the threatened spread of the malicious program.

By blocking the proliferation of packets corresponding to malicious programs, the spread of the malicious program from one subnet to another and/or from one computer network to another may be prevented. Additionally, blocking the proliferation of packets corresponding to malicious programs can prevent packets corresponding to malicious programs from flooding onto the backbone 119 and potentially consuming large allotments of backbone 119 bandwidth potentially resulting in a slowdown of the entire network.

Figure 2:
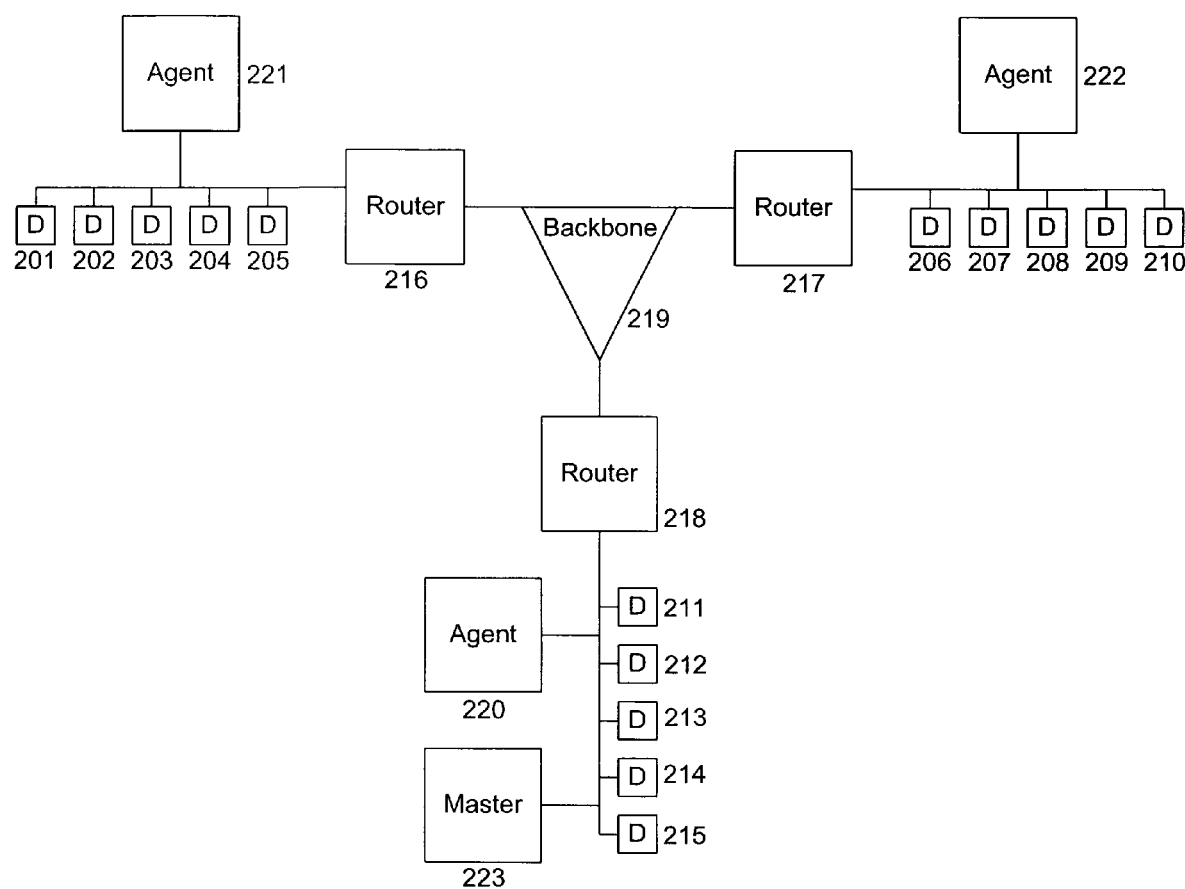
FIG. 2 illustrates an example of a passive IDS according to an embodiments of the present disclosure.

FIG. 2 illustrates an example of passive IDSs according to an embodiment of the present disclosure (passive embodiments of the present disclosure). In this example, a plurality of network devices 201-205 form a first subnet. A first router 216 connects the first subnet to the network backbone 219. According to passive embodiments of the present disclosure, any network device may connect the subnets to the backbone 219, alternatively, an Agent 220-222 may connect subnets to the network backbone 219 as is done in active embodiments of the present disclosure. According to passive embodiments of the present disclosure, Agents 220-222 monitor the exchange of packets throughout the subnet and communicate with the Master 223. While there may be multiple Agents 220-222, a single Master 223 is all that is generally required. Agents 220-222 may be dedicated network devices and/or Agents 220-222 may be computer programs executed on a network device, for example a computer connected to the network. Agents 220-222 may be placed at any locations within the subnet.

A second router 217 connects a second subnet formed by a plurality of network devices 206-210 to the network backbone 219 and a third router 218 connects a third subnet formed by a plurality of network devices 211-215 to the network backbone 219.

Agents 220-222 may be able to monitor packets that are communicated across the respective subnets and report packet information to the Master 223. The Master 223 may be located anywhere within the computer network, for example, within one of the subnets, or may be located outside of the computer network, for example, on a remote server connected over the internet through a virtual private network (VPN).

According to some passive embodiments of the present disclosure, Agents 220-222 may send sample packets to the Master 223.

The Master 223 analyzes the sample packets and may look for indications of a malicious program infection. When proliferation of similar packets is detected by the Master 223, the Master 223 can generate a signature for the proliferating packets. The signature may then be sent to the Agents 220-222. According to passive embodiments of the present disclosure, Agents 220-222 can log the proliferation of packets matching the signature sent to it by the Master 223.

By logging the proliferation of packets corresponding to malicious programs, network administrators can identify and take steps to correct the spread of the malicious program.

Figure 3:
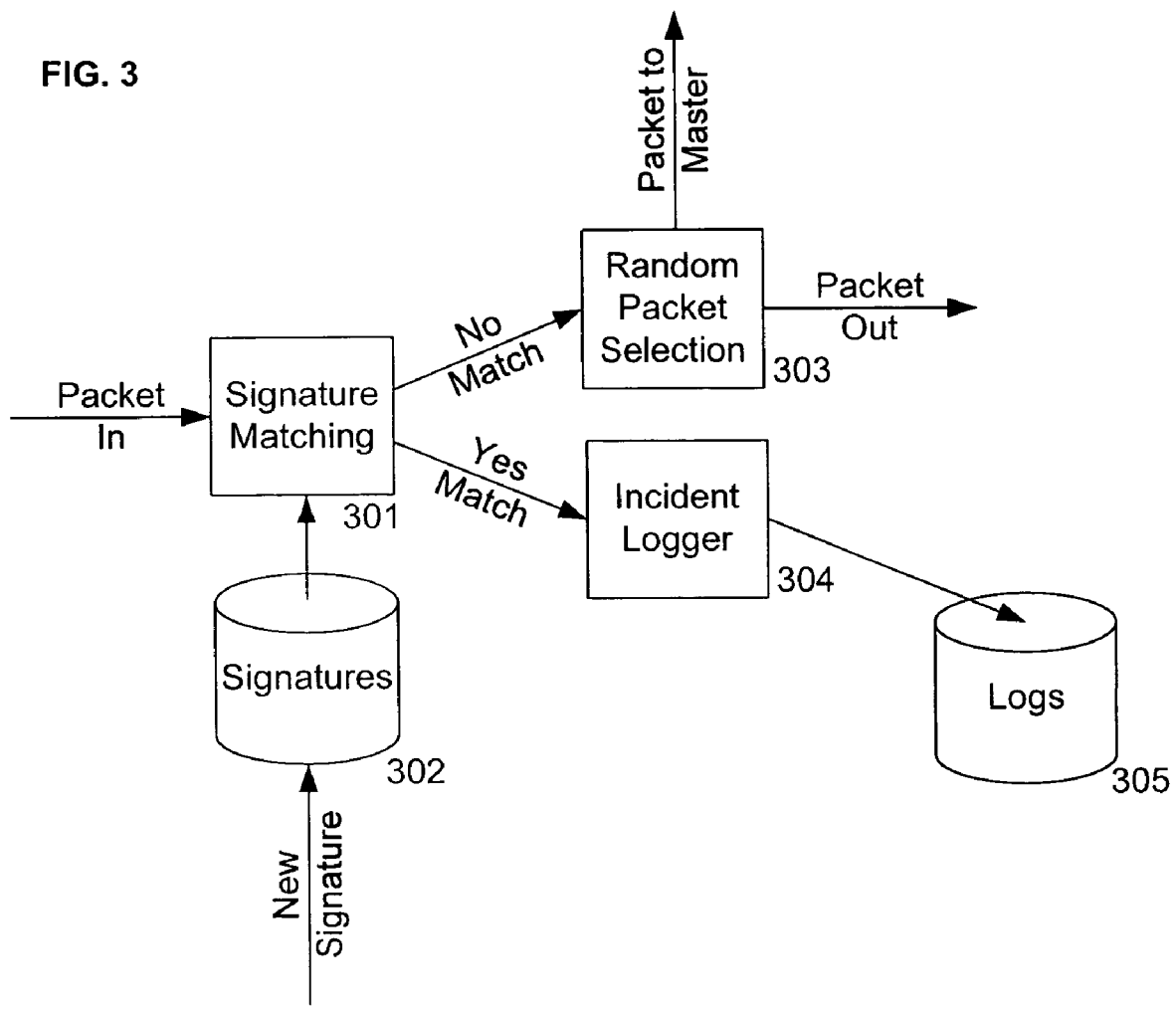
FIG. 3 illustrates the operation of an Agent for an active IDS according to an embodiment of the present disclosure.

FIG. 3 illustrates the operation of an Agent 116-118 for an active IDS according to embodiments of the present disclosure.

Packets enter the Agent 116-118 through the signature matching unit 301. New signatures enter the Agent 116-118 through the signatures database 302. If there are signatures located within the signature database 302 then the signature matching unit 301 compares the incoming packet with the signatures within the signature database 301. If the packet matches a signature, then the match may be logged in the log database 305. Packets that match may be prevented from being output. If the packet does not match, or there are no signatures in the signature database 302, the packet enters the random selection unit 303. If the packet is selected to be a sample packet, the packet may be sent to the Master 120. Regardless of whether the packet is selected to be a sample packet, the packet may be output. Where the Agent 116-118 is examining packets sent from the subnet to the rest of the network, the packets may be input from the subnet to the signature matching unit 301 and output from the random packet selection unit 303 to the rest of the network. Where the Agent 116-118 is examining packets sent from the rest of the network to the subnet, the packets may be input from the rest of the network to the signature matching unit 301 and output from the random packet selection unit 303 to the subnet.

According to another active embodiment of the present disclosure, additional signatures may be supplied to the signature database 302 from external sources, for example, from signature updates created and distributed by the IDS vender. For these embodiments, it is possible to more easily protect networks against known malicious programs.

Figure 4:
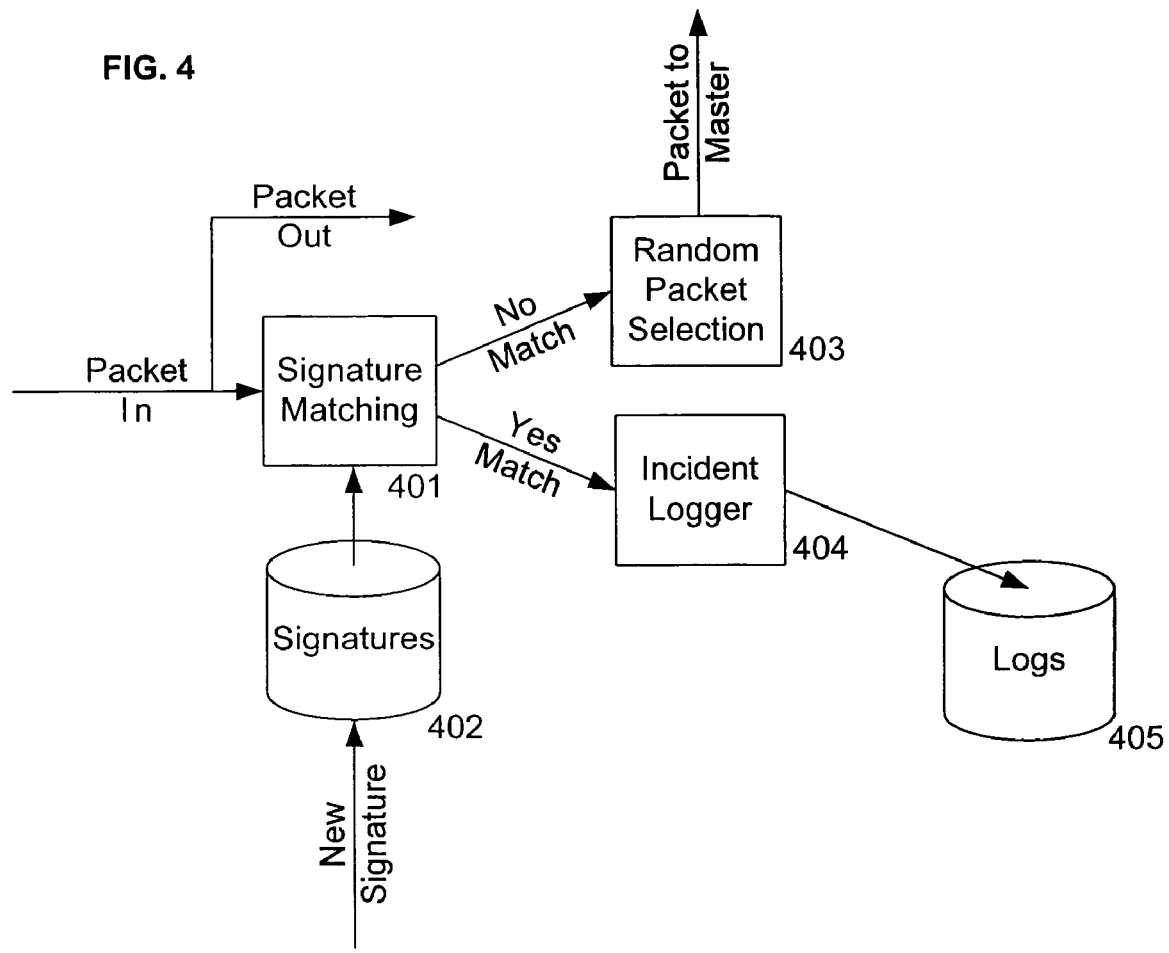
FIG. 4 illustrates the operation of an Agent for a passive IDS according to an embodiment of the present disclosure.

FIG. 4 illustrates the operation of an Agent 220-222 for a passive IDS according to embodiments of the present disclosure.

According to some passive embodiments, packets that enter the Agent 220-222 are allowed to pass out of the Agent 220-222 and on to their designated recipient address. A copy of each packet that passes through the Agent 220-222 may be sent to the signature matching unit 401. New signatures enter the Agent 220-222 through the signatures database 402. If there are signatures located within the signature database 402 then the signature matching unit 401 can compare the incoming packet with the signatures within the signature database 402. If the packet matches a signature, then the match may be logged in the log database 405. If the packet does not match, or there are no signatures in the signature database 402, the packet may enter the random selection unit 403. If the packet is selected to be a sample packet, the packet may be sent to the Master 223.

According to another passive embodiment of the present disclosure, additional signatures may be supplied to the signature database 402 from external sources, for example, from signature updates created and distributed by the IDS vender.

Figure 5:
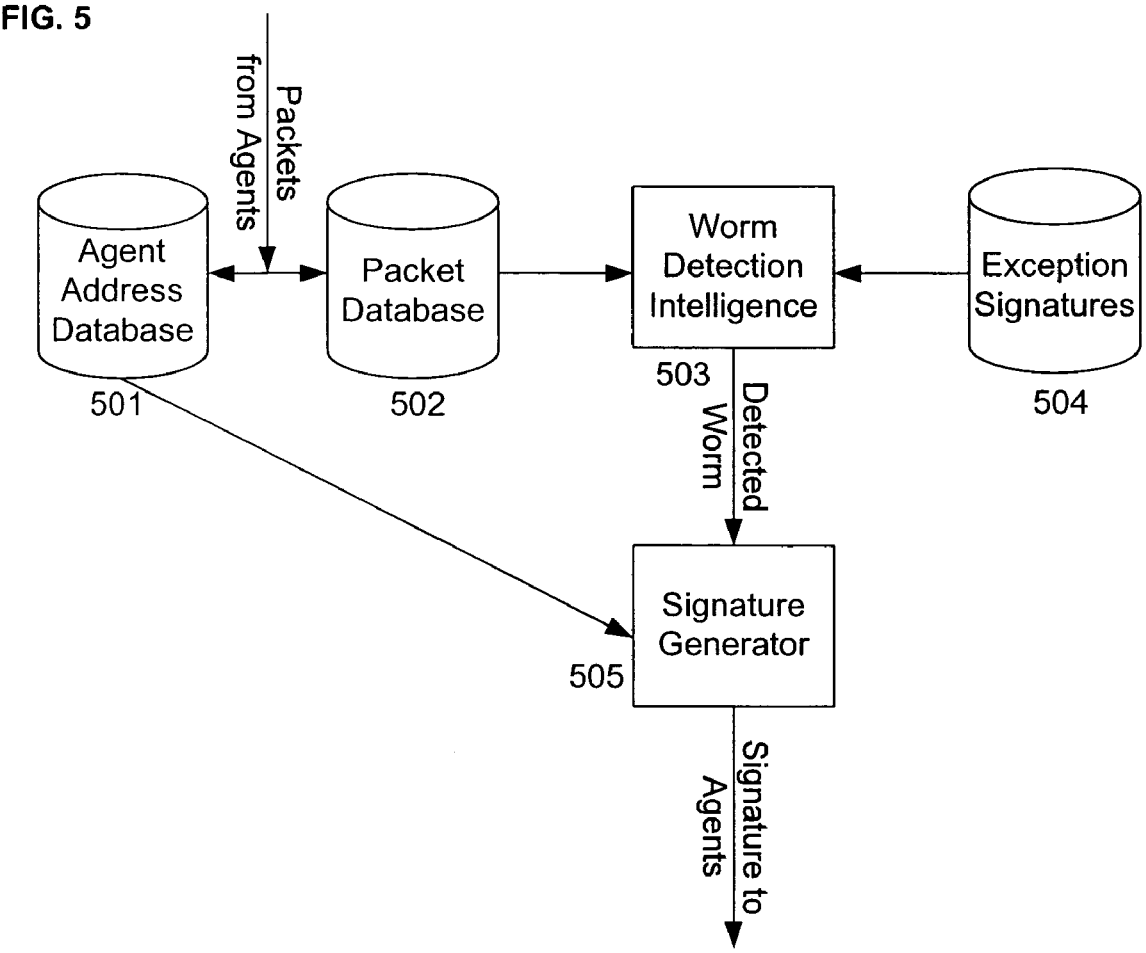
FIG. 5 illustrates the operation of a Master according to an embodiment of the present disclosure.

FIG. 5 illustrates the operation of a Master 120, 223 according to embodiments of the present disclosure. Selected sample packets may be received from the Agents 116-118, 220-222. The source address of the packet may be added to the agent address database 501. This allows the Master 120, 223 to keep track of the Agents 116-118, 220-222 that send packets to the Master 120, 223 so that in the event signatures may be created by the Master 120, 223, these signatures can be sent back to the Agents 116-118, 223-222 that send packets to the Master 120, 223. Alternatively, the agent address database 501 may be preprogrammed to include the addresses of all agents 116-118, 220-222 that are to receive signatures. In such cases, it might not be useful for the addresses of incoming packets to be recorded in the agent address database 501. The packet may then be sent to a packet database 502. The packet database 502 allows the worm detection intelligence 503 to examine multiple packets at the same time to determine the presence of a malicious program. The worm detection intelligence 503, for example, uses factors such as the frequency of the receipt of common packets to determine if a malicious program is propagating. A database of exception signatures 504 may be provided to supply the worm detection intelligence 503 with a list of scenarios that are known not to be caused by malicious program infection even though the scenarios might otherwise exhibit characteristics indicative of malicious program infection. For example, the exception database 504 might inform the worm detection intelligence 503 that a particular mass email is not indicative of a malicious program even though the mass email results in the transmission of common packets. The exception signature database 504 can also be used by the network administrator to inform the Master 120, 223 of any mistakes made by the worm detection intelligence 503 so those mistakes need not be repeated. If the worm detection intelligence 503 determines that there is an infection from a malicious program, and the scenario is not listed in the exception signature database 504, then a packet believed to be the result of the malicious program infection may then be sent to the signature generator 505. The signature generator 505 may generate a signature that can be used to detect the packets created as a result of the malicious program and sends the signature to all Agents 116-118, 220-222 using the addresses listed in the Agent address database 501.

The present disclosure is not limited to the analysis of whole packets. For example, packets sent to the Master 120, 223 may be broken into units of data smaller than one packet (a sub-packet). These sub-packets may then be individually stored in the packet database 502. The worm detection intelligence 503 would then examine the sub-packets for signs of an infection from a malicious program. For example, the frequency of similar sub-packets can be tracked. Analysis of sub-packets can aid in the identification of malicious programs that generate data smaller than a full packet and in cases where the malicious program attempts to disguise itself by changing forms as it propagates (polymorphic malicious programs).

Figure 6:
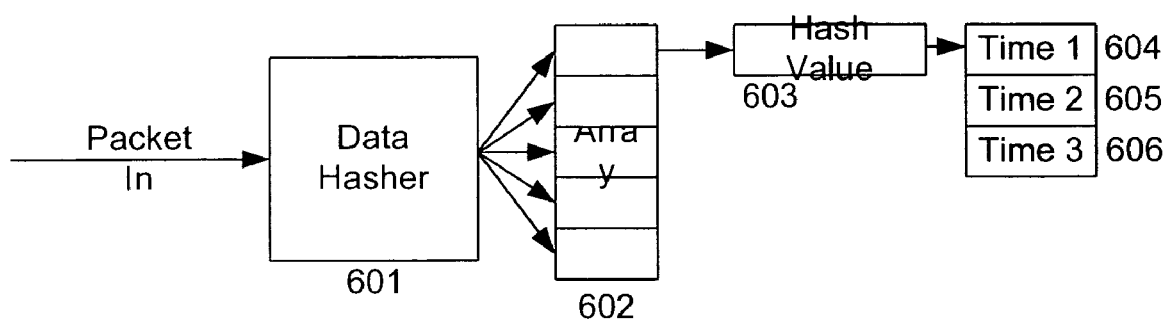
FIG. 6 illustrates the operation of a packet database 502 according to an embodiment of the present disclosure.

FIG. 6 illustrates the operation of a packet database 502 according to embodiments of the present invention.

When a packet arrives to the Master 120, 223 from an Agent 116-118, 220-222, the packet may be sent to a data hasher 601. The data hasher 601 may compute a hash value for the sent packet. The hash value may then be entered into an array of hash values 602 that keeps track of the number of packets that have been observed for each observed hash value within a set length of time. For example, each hash value in the array 603 may be associated with a list of times that the hash value was observed 604-606. As new instances of a particular hash value are observed, the new time of observation may be added to the beginning of the list. Instances deemed too remote in time may be removed from the list. For example, instances observed more than 5 minutes ago may be removed from the list. By keeping track of the number of instances within a particular length of time, the packet database 502 can calculate the frequency of observation of a particular packet, and this information can be used by the worm detection intelligence 503 to help determine the presence of a malicious program infection.

Figure 7:
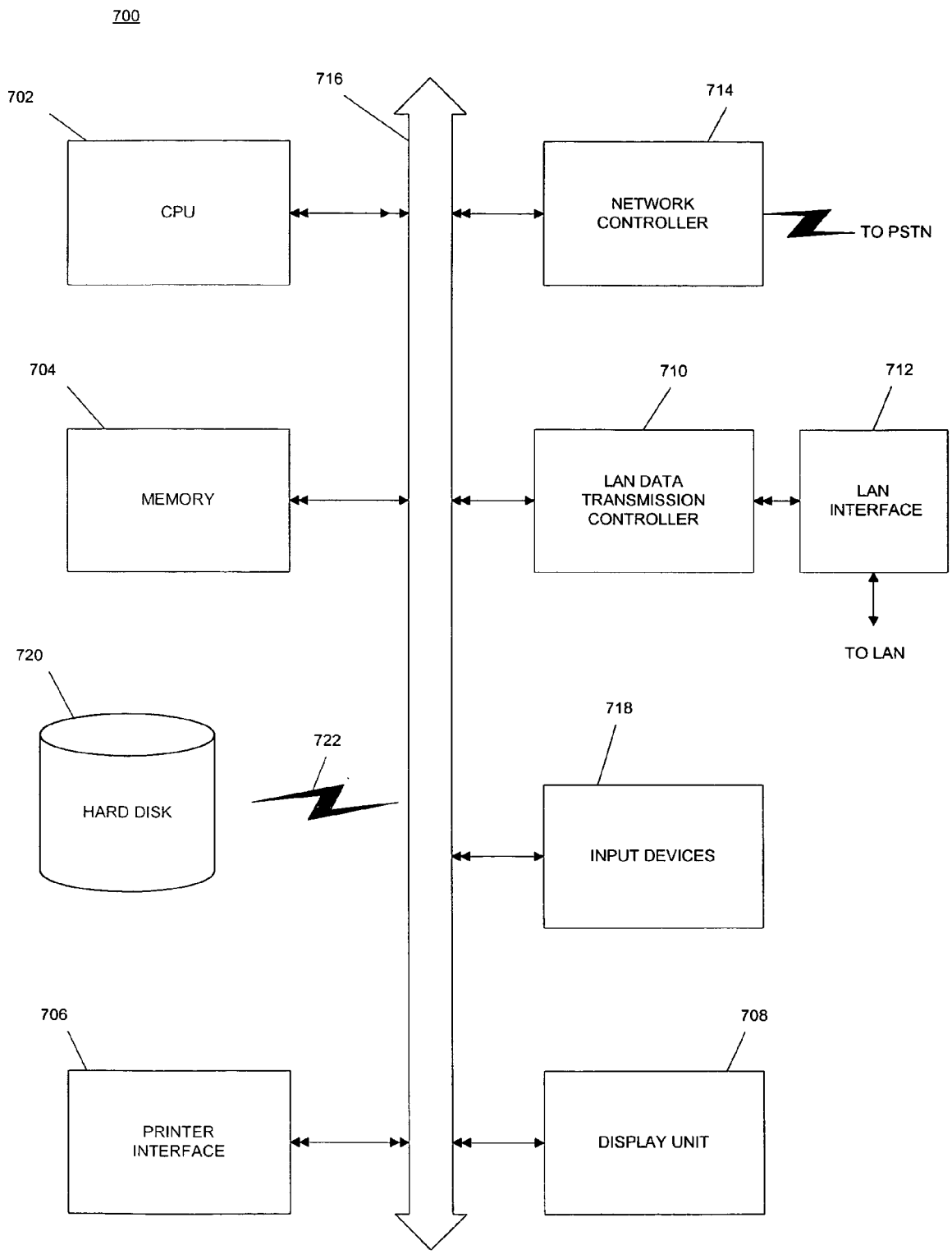
FIG. 7 illustrates an example of a computer system capable of implementing the method and apparatus of the present disclosure.

FIG. 7 depicts an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a computer recording media locally accessible by the computer system and accessible via a hard wired or wireless connection to a network, for example, a local area network, or the Internet.

The computer system referred to generally as system 700 may include, for example, a central processing unit (CPU) 702, random access memory (RAM) 704, a printer interface 706, a display unit 708, a local area network (LAN) data transmission controller 710, a LAN interface 712, a network controller 714, an internal buss 716, and one or more input devices 718, for example, a keyboard, mouse etc. As shown, the system 700 may be connected to a data storage device, for example, a hard disk, 720 via a link 722.

What is claimed is:

1. A method for detecting malicious programs within a computer network comprising:
    monitoring, by a first one of one or more agents within the computer network, at least one first packet of data communicated over said computer network, the first agent comprising a first agent network device;
    at the first agent, comparing information within the at least one first packet to one or more virus scanning signature files to determine that the information within the at least one first packet does not match one of the one or more virus scanning signature files;
    in response to determining that the at least a portion of the information in the at least one first packet does not match one of the one or more virus scanning signature files, transmitting, by the first agent comprising the first agent network device, said at least one first packet of data to a master within the computer network, the master comprising a network device in communication with the first agent network device via the computer network;
    analyzing, by the master, said at least one first packet of data to detect the presence of a malicious program;
    generating, by the master, a signature of said at least one first packet of data when a malicious program is detected;
    transmitting the signature from the master comprising the network device to the first agent comprising the first agent network device and at least a second one of the one or more agents, the signature transmitted via the computer network;
    monitoring, by a second one of the one or more agents, at least one second packet of data communicated over said network; and
    detecting, by the second agent, evidence of said malicious program in said at least one second packet of data utilizing said generated signature.

2. The method of claim 1, wherein said at least one first packet of data is selected at random from among a plurality of packets of data that are communicated over said network.

3. The method of claim 1, wherein said at least one first packet of data is selected at a set interval from among a plurality of packets of data that are communicated over said network.

4. The method of claim 1, wherein said at least one second packet of data that evidences said malicious program is prevented from being delivered to its destination address.

5. The method of claim 1, wherein instances of detected evidence of said malicious program in said at least one second packet of data are logged.

6. The method of claim 1, wherein one or more supplied signatures are used along with said generated signatures to detect evidence of said malicious program in said at least one second packet of data.

7. The method of claim 1, wherein analyzing said at least one first packet of data to detect the presence of a malicious program comprises watching for a proliferation of similar packets among said at least one first packet of data.

8. The method of claim 1, wherein:
monitoring said at least one first packet of data communicated over said network is performed by the first agent located at a first agent address;
monitoring said at least one second packet of data communicated over said network is performed by the second agent located at a second agent address; and
said generated signatures are sent to said first and second agents located at first and second agent addresses respectively.

9. The method of claim 8, wherein an agent address database is created by recording a plurality of agent addresses and said agent address database is used to send one or more generated signatures to a plurality of agents located at the plurality of agent addresses respectively.

10. The method of claim 1, wherein said at least one first packet of data and said at least one second packet of data are sub-packets.

11. A system for detecting malicious programs within a computer network comprising:
a first agent network device within the computer network configured to:
monitor at least one first packet of data communicated over said network;
compare information within the at least one first packet to one or more virus scanning signature files to determine that the information within the at least one first packet does not match one of the one or more virus scanning signature files; and
in response to determining that the at least a portion of the information in the at least one first packet does not match one of the one or more virus scanning signature files, transmit said at least tone first packet of data to a master within the computer network;
a master comprising a network device in communication with the first agent network device via the computer network, the master configured to:
analyze said at least one first packet of data to detect the presence of a malicious program;
generate a signature of said at least one first packet of data when a malicious program is detected; and
transmit, via the computer network, said signature to the first agent network device and at least a second one of the one or more agents; and
a second agent network device within the computer network configured to:
monitor at least one second packet of data communicated over said network; and
detect evidence of said malicious program in said at least one second packet of data utilizing said generated signature.

12. The system of claim 11, wherein said at least one first packet of data is selected at random from among a plurality of packets of data that are communicated over said network.

13. The system of claim 11, wherein said at least one first packet of data is selected at a set interval from among a plurality of packets of data that are communicated over said network.

14. The system of claim 11, wherein said at least one second packet of data that evidences said malicious program is prevented from being delivered to a destination address.

15. The system of claim 11, wherein instances of detected evidence of said malicious program in said at least one second packet of data are logged.

16. The system of claim 11, wherein one or more supplied signatures are used along with said generated signatures to detect evidence of said malicious program in said at least one second packet of data.

17. The system of claim 11, wherein analyzing said at least one first packet of data comprises watching for a proliferation of similar packets among said at least first packet of data.

18. The system of claim 11, wherein:
monitoring said at least one first packet of data communicated over said network is performed by the first agent network device located at a first agent address;
monitoring said at least one second packet of data communicated over said network is performed by the second agent network device located at a second agent address; and
said generated signatures are sent to said first and second agent network devices located at first and second agent addresses respectively.

19. The system of claim 18, wherein an agent address database is created by recording a plurality of agent addresses and said agent address database is used to send one or more generated signatures to a plurality of agent network devices located at the plurality of agent addresses respectively.

20. The system of claim 11, wherein said at least one first packet of data and said at least one second packet of data are sub-packets.

21. A computer system comprising:
a processor; and
a non transitory computer recording medium including computer executable code executable by the processor for detecting malicious programs within a computer network, the computer executable code operable when executed to:
monitor, by a first one of one or more agents within the computer network, at least one first packet of data communicated over said computer network, the first agent comprising a first agent network device;
compare, by the first agent, information within the at least one first packet to one or more virus scanning signature files to determine that the information within the at least one first packet does not match one of the one or more virus scanning signature files;
in response to determining that the at least a portion of the information in the at least one first packet does not match one of the one or more virus scanning signature files, transmit, by the first agent comprising the first agent network device, said at least one first packet of data to a master within the computer network, the master comprising a network device in communication with the first agent network device via the computer network;
analyze, by the master, said at least one first packet of data to detect the presence of a malicious program;
generate, by the master, a signature of said at least one first packet of data when a malicious program is detected;
transmit the signature from the master comprising the network device to the first agent comprising the first agent network device and at least a second one of the one or more agents, the signature transmitted via the computer network;
monitor, by a second one of the one or more agents, at least one second packet of data communicated over said network; and
detect, by the second agent, evidence of said malicious program in said at least one second packet of data utilizing said generated signature.

22. The computer system of claim 21, wherein said at least one first packet of data is selected at random from among a plurality of packets of data that are communicated over said network.

23. The computer system of claim 21, wherein said at least one first packet of data is selected at a set interval from among a plurality of packets of data that are communicated over said network.

24. The computer system of claim 21, wherein said at least one second packet of data that evidence said malicious program is prevented from being delivered to a destination address.

25. The computer system of claim 21, wherein instances of detected evidence of said malicious program in said at least one second packet of data are logged.

26. The computer system of claim 21, wherein one or more supplied signatures are used along with said generated signatures to detect evidence of said malicious program in said at least one second packet of data.

27. The computer system of claim 21, wherein analyzing said at least one first packet of data to detect the presence of a malicious program comprises watching for a proliferation of similar packets among said at least one first packet of data.

28. The computer system of claim 21, wherein:
monitoring said at least one first packet of data communicated over said network is performed by the first agent located at a first agent address;
monitoring said at least one second packet of data communicated over said network is performed by the second agent located at a second agent address; and
said generated signatures are sent to said first and second agents located at first and second agent addresses respectively.

29. The computer system of claim 28, wherein an agent address database is created by recording a plurality of agent addresses and said agent address database is used to send one or more generated signatures to a plurality of agents located at the plurality of agent addresses respectively.

30. The computer system of claim 21, wherein said at least one first packet of data and said at least one second packet of data are sub-packets.

31. A non transitory computer recording medium storing computer executable code executable by a processor for detecting malicious programs within a computer network, wherein the computer executable code is operable when executed by the processor to:
monitor, by a first one of one or more agents within the computer network, at least one first packet of data communicated over said computer network, the first agent comprising a first agent network device;
compare, by the first agent, information within the at least one first packet to one or more virus scanning signature files to determine that the information within the at least one first packet does not match one of the one or more virus scanning signature files;
in response to determining that the at least a portion of the information in the at least one first packet does not match one of the one or more virus scanning signature files, transmit, by the first agent comprising the first agent network device, said at least one first packet of data to a master within the computer network, the master comprising a network device in communication with the first agent network device via the computer network;
analyze, by the master, said at least one first packet of data to detect the presence of a malicious program;
generate, by the master, a signature of said at least one first packet of data when a malicious program is detected;
transmit the signature from the master comprising the network device to the first agent comprising the first agent network device and at least a second one of the one or more agents, the signature transmitted via the computer network;
monitor, by a second one of the one or more agents, at least one second packet of data communicated over said network; and
detect, by the second agent, evidence of said malicious program in said at least one second packet of data utilizing said generated signature.

32. The computer recording medium of claim 31, wherein said at least one first packet of data is selected at random from among a plurality of packets of data that are communicated over said network.

33. The computer recording medium of claim 31, wherein said at least one first packet of data is selected at a set interval from among a plurality of packets of data that are communicated over said network.

34. The computer recording medium of claim 31, wherein said at least one second packet of data is prevented from being delivered to a destination address.

35. The computer recording medium of claim 31, wherein instances of detected evidence of said malicious program in said at least one second packet of data are logged.

36. The computer recording medium of claim 31, wherein one or more supplied signatures are used along with said generated signatures to detect evidence of said malicious program in said at least one second packet of data.

37. The computer recording medium of claim 31, wherein analyzing said at least one first packet of data to detect the presence of a malicious program comprises watching for a proliferation of similar packets among said at least one first packet of data.

38. The computer recording medium of claim 31, wherein:
monitoring said at least one first packet of data communicated over said network is performed by the first agent located at a first agent address;
monitoring said at least one second packet of data communicated over said network is performed by the second agent located at a second agent address; and
said generated signatures are sent to said first and second agents located at first and second agent addresses respectively.

39. The computer recording medium of claim 38, wherein an agent address database is created by recording a plurality of agent addresses and said agent address database is used to send one or more generated signatures to a plurality of agents located at the plurality of agent addresses respectively.

40. The computer recording medium of claim 31, wherein said at least one first packet of data and said at least one second packet of data are sub-packets.

41. The method of claim 1, wherein said at least one first packet of data and said at least one second packet of data are received by the one or more agents from a first set of one or more subnets of the network and destined for a second set of one or more subnets of the network.

42. The method of claim 1, wherein the second agent comprises a third network device in communication with the master via the computer network.

* * * * *